(12) United States Patent
Reedy et al.

(10) Patent No.: US 9,472,899 B1
(45) Date of Patent: Oct. 18, 2016

(54) ADAPTABLE ELECTRICAL PLUG ASSEMBLY

(71) Applicant: Delphi Technologies, Inc., Troy, MI (US)

(72) Inventors: Patrick Joseph Reedy, Youngstown, OH (US); Terry A. George, Salem, OH (US); Don E. Bizon, Boardman, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/932,261

(22) Filed: Nov. 4, 2015

(51) Int. Cl.
*H01R 29/00* (2006.01)
*H01R 13/642* (2006.01)
*B60L 11/18* (2006.01)
*H01R 31/06* (2006.01)

(52) U.S. Cl.
CPC ......... *H01R 13/642* (2013.01); *B60L 11/1818* (2013.01); *H01R 31/06* (2013.01)

(58) Field of Classification Search
USPC ....... 439/166, 170, 171, 172, 174, 217, 218, 439/518, 956
See application file for complete search history.

(56) References Cited

U.S. PATENT DOCUMENTS

| 3,034,000 | A | * | 5/1962 | Todd | B26B 19/38 200/51 LM |
| 4,585,286 | A | * | 4/1986 | Parr | H01R 31/06 439/173 |
| 5,513,998 | A | * | 5/1996 | Kim | H01R 31/06 439/170 |
| 6,699,052 | B1 | | 3/2004 | Poran | |
| 8,951,075 | B2 | | 2/2015 | Ekchian | |
| 2003/0211767 | A1 | | 11/2003 | Philips et al. | |
| 2006/0099840 | A1 | * | 5/2006 | Yeh | H01R 24/62 439/172 |

FOREIGN PATENT DOCUMENTS

WO        2014144990 A1    9/2014

* cited by examiner

*Primary Examiner* — Tho D Ta
(74) *Attorney, Agent, or Firm* — Robert J. Myers

(57) ABSTRACT

An electrical plug assembly including a plug housing having a first set of pins projecting from a first surface and a second set of pins projecting from an opposed second surface. The electrical plug assembly also includes an enclosure slideably attached to the plug housing. The enclosure slides to expose one set of pins while enclosing the other set of pins. The electrical plug assembly further includes a hood pivotally attached to the plug housing and slideably attached to the enclosure. The enclosure is rotatable from a first position to a second position. As the hood rotates, it slides the enclosure from a first location wherein the first set of pins is exposed to a second location wherein the second set of pins is exposed. The first set of pins conform to one technical standard, e.g. NEMA 6-20P while the second set of pins conform to another technical standard, e.g. NEMA 5-15P.

15 Claims, 6 Drawing Sheets

ADAPTABLE ELECTRICAL PLUG ASSEMBLY

TECHNICAL FIELD OF THE INVENTION

The invention relates to an electrical plug assembly, particularly an electrical plug assembly adaptable to mate with various receptacles conforming to different receptacle configuration standards.

BACKGROUND OF THE INVENTION

National technical standards exist to define the physical and electrical characteristics of electrical plugs and their associated receptacles. The intent of these technical standards is to promote safety and operability between power sources and electronic devices that require electrical power. Historically, a particular electronic device would be designed for a specific source voltage and maximum current source and so would be manufactured with a fixed plug that is configured to insert into its complementary power-source receptacle. For example, an electronic device in North America requiring 220 volts and drawing a maximum current of 15 amperes would be supplied with a plug meeting the National Electrical Manufacturers Association (NEMA) 6-20 standard configured for insertion into a receptacle also conforming to the NEMA 6-20 standard. However, the NEMA 6-20 plug cannot be inserted into a receptacle capable of providing a lower 110 volt source voltage, such as a NEMA 5-15 standard receptacle.

However, electronic devices are currently being manufactured that have built-in power electronics capable of converting various input voltages into an appropriate electrical power for the device. While an electronic device might be configured with a NEMA 6-20 plug for use with a 220V supply, it may be also operable with 110V power provided by a NEMA 5-15 receptacle Current solutions have involved the inclusion of a common plug to the electronic device and the use of two different power supply cords. A first cord has a common receptacle that is designed to mate with the plug in the electronic device on one end of the cord and a NEMA 6-20 plug the other. The second cord has the common receptacle on one end and a NEMA 5-15 plug on the other. This solution requires the addition of the common receptacle to the electronic device as well as a second power supply cord, adding additional cost to the device. A lower cost solution remains to be desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of the invention, an electrical plug assembly is provided. The electrical plug assembly includes a plug housing that further includes a plurality of conductive first pins projecting from a first surface of the plug housing and a plurality of conductive second pins projecting from a second surface of the plug housing opposed to the first surface. The electrical plug assembly also includes an enclosure that is slideably attached to the plug housing. The enclosure defines a first plurality of apertures though which the plurality of first pins may protrude and a second plurality of apertures though which the plurality of second pins may protrude. The plurality of first pins are at least partially enclosed within the enclosure when the plurality of second pins protrude from the second plurality of apertures and the plurality of second pins are at least partially enclosed within the enclosure when the plurality of first pins protrude from the first plurality of apertures.

The electrical plug assembly may further include a hood that is pivotally attached to the plug housing and that is slideably attached to the enclosure. The enclosure is rotatable from a first position to a second position. The hood is configured to urge the enclosure from a first location to a second location. The plurality of first pins are fully enclosed within the enclosure and the plurality of second pins protrude from the second plurality of apertures when the enclosure is in the first location. The plurality of second pins are completely enclosed within the enclosure and the plurality of first pins protrude from the first plurality of apertures when the enclosure is in the second location. The enclosure is in the first location when the hood is in the first position and the enclosure is in the second location when the hood is in the second position. The hood encloses the first plurality of apertures when in the first position and encloses the second plurality of apertures when in the second position.

A configuration of the plurality of first pins may conform to a first technical specification and a configuration of the plurality of second pins conform to a second technical specification distinct from the first technical specification. The configuration of the plurality of first pins may conform to a National Electrical Manufacturers Association (NEMA) 5-15P standard and the configuration of the plurality of second pins may conform to a NEMA 6-20P standard.

An electrical power cord assembly may include an electrical power cord and the electrical plug assembly described above. An electric vehicle battery charging assembly, may include an electric vehicle battery charging device capable of receiving electrical power having various source voltages the electrical power cord assembly described above.

In accordance with another embodiment of the invention, an electrical plug assembly that is reconfigurable to mate with two different electrical receptacles conforming to different technical specifications is provided. The electrical plug assembly includes a plurality of conductive electrical terminals, each defining a conductive first pin and a conductive second pin. The electrical plug assembly also includes a plug housing in which the plurality of electrical terminals are disposed. The plug housing has a first end surface from which the plurality of first pins project and a second end surface opposed to the first end surface from which the plurality of second pins project. The plug housing defines pivot posts projecting from each of two opposed side surfaces. The electrical plug assembly further includes an enclosure having two opposed side walls, two opposed end walls and a top wall defining cavity in which the plug housing is received. The two opposed side walls each define slide posts projecting from the side walls and also define linear slots in which the pivot posts are received thereby slideably attaching the enclosure to the plug housing. A first end wall of the two opposed end walls defines a first plurality of apertures though which the plurality of first pins may protrude. A second end wall of the two opposed end walls defines a second plurality of apertures though which the plurality of second pins may protrude. The plurality of first pins are at least partially enclosed within the enclosure when the plurality of second pins protrude from the second plurality of apertures and the plurality of second pins are at least partially enclosed within the enclosure when the plurality of first pins protrude from the first plurality of apertures.

The electrical plug assembly may further include a hood having an arcuate top wall and two generally sector shaped side walls. Each of the side walls defines arcuate slots and pivot apertures. The pivot posts of the plug housing are received within the pivot apertures thereby pivotally attaching the hood to the plug housing. The slide posts of the enclosure are received within the arcuate slots thereby slideably attaching the hood to the enclosure and limiting rotation of the hood about the pivot posts from a first position to a second position. The slide posts and the arcuate slots cooperate to urge the enclosure from a first location to a second location as the hood is rotated about the pivot posts.

The plurality of first pins are fully enclosed within the enclosure and the plurality of second pins protrude from the second plurality of apertures when the enclosure is in the first location and the plurality of second pins are completely enclosed within the enclosure and the plurality of first pins protrude from the first plurality of apertures when the enclosure is in the second location. The enclosure is in the first location when the hood is in the first position and the enclosure is in the second location when the hood is in the second position. The hood encloses the first plurality of apertures when in the first position and the hood encloses the second plurality of apertures when in the second position.

A configuration of the plurality of first pins may conform to a first technical specification and a configuration of the plurality of second pins may conform to a second technical specification distinct from the first technical specification. The configuration of the plurality of first pins may conform to a National Electrical Manufacturers Association (NEMA) 5-15P standard while the configuration of the plurality of second pins conform to a NEMA 6-20P standard.

An electrical power cord assembly may include an electrical power cord and the electrical plug assembly described above. An electric vehicle battery charging assembly, may include an electric vehicle battery charging device capable of receiving electrical power having various source voltages the electrical power cord assembly described above.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figures 1A, 1B:
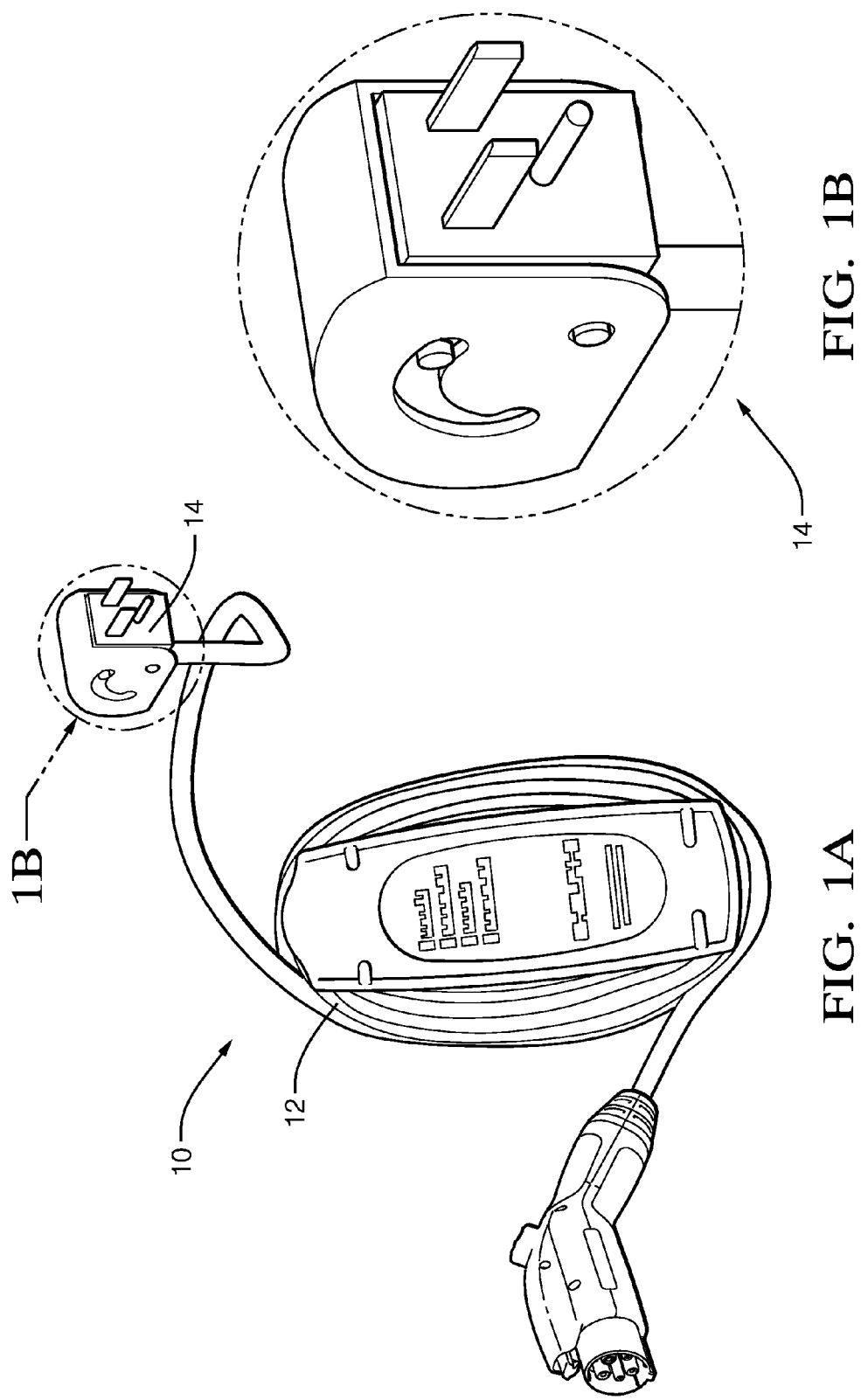
FIG. 1A is a perspective view of an electric vehicle battery charging device having a power cord terminated by an electrical plug assembly according to one embodiment.
FIG. 1B is a close-up perspective view of the electrical plug assembly of the electric vehicle battery charging device of FIG. 1A according to one embodiment.

An adaptable electrical plug assembly, hereinafter referred to as the plug assembly, is presented herein. The plug assembly terminates one end of a power supply cord attached to an electrical device, such as electric vehicle battery charging device, capable of receiving electrical power having various source voltages. The plug assembly includes a plug housing having two sets terminal pins projecting from opposite faces of the plug housing. One set of terminal pins are configured to interface with a power supply receptacle conforming to a first technical standard and the second set of terminal pins are configured to interface with a power supply receptacle conforming to a second technical standard.

As used herein, a "technical standard" is a formalized public document that defines a uniform physical and/or electrical configuration for a product, whether promulgated by a standards body, a regulatory body, or as a "de facto" standard set by widespread adoption. Technical standards include the standards established by the National Electrical Manufacturers Association ("NEMA") in the United States for use with alternating current (AC) electrical power connections, including but not limited to NEMA 5-15, NEMA 6-15, NEMA 5-20, and NEMA 6-20. Although a particular standard may have sub sections defining a receptacle configuration and plug configuration (and so designated with 'R' or 'P'), the description herein treats "a technical standard" as encompassing both receptacle and plug configurations in the same technical standard. The technical standards may also include standards defining electrical plugs and receptacles from outside of the United States.

The plug assembly includes an enclosure that is slideably attached to the plug housing. When the enclosure is in a first location relative to the plug housing, the first set of terminal pins protrude though a corresponding set of apertures in the enclosure so that they may be inserted into a corresponding receptacle and the second set of terminal pins are completely contained within the enclosure, protecting them from inadvertent contact. When the enclosure is slid to a second location, the second set of terminal pins protrude though another corresponding set of apertures in the enclosure and the first set of terminal pins are contained within the enclosure.

The plug assembly further includes a hood that is pivotally attached to the plug housing and slideably attached to the enclosure. As the enclosure is rotated about a pivot post on the plug housing from a first position to a second position, the hood slides the enclosure from the first location to the second location, pushing the second set of terminal pins through the corresponding apertures and withdrawing the first set of terminal pins within the enclosure. The hood further covers the apertures for the first set of terminal pins. As the enclosure is rotated about a pivot post on the plug housing from the second position back to the first position, the hood slides the enclosure from the second location to the first location, pushing the first set of terminal pins through the corresponding apertures and withdrawing the second set of terminal pins within the enclosure. In the second position, the hood covers the apertures for the second set of terminal pins.

Thus, by rotating the hood between a first and second position, the plug assembly can be configured or adapted to plug into one of two different receptacles conforming to different technical specification.

FIG. 1A illustrates a non-limiting example of an electronic device 10, in this case an electric vehicle battery charging device 10 that has a power supply cord 12 terminated by a plug assembly 14. The electric vehicle battery charging device 10 is designed to operate from either a 110V/60 Hz AC or a 220V/60 Hz power source (not shown). FIG. 1B provides a close-up view of the plug assembly 14 of electric vehicle battery charging device 10 in one configuration, in this example adapted to connect with a NEMA 5-15R receptacle.

Figure 2:
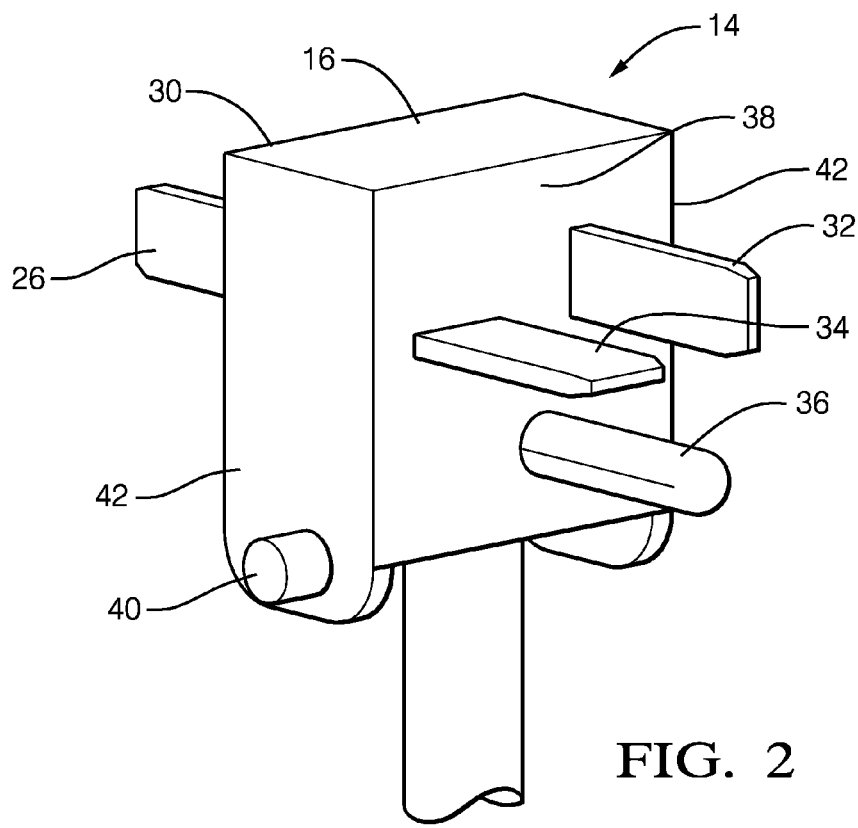
FIG. 2 is a perspective front view of plug housing of an electrical plug assembly according to one embodiment.

FIG. 2 illustrates a non-limiting example of a plug housing 16 of the plug assembly 14. The plug housing 16 is designed to be attached to the end of a power supply cord 12 containing a ground wire and a pair of power wires (not shown). The plug housing 16 may define a flexible strain relief device (not shown) that surrounds the end of the power supply cord 12 and provides protection against wire breakage due to localized flexing of the wires. The plug housing 16 is formed of a dielectric material, e.g. polyvinyl chloride (PVC).

Figure 3:
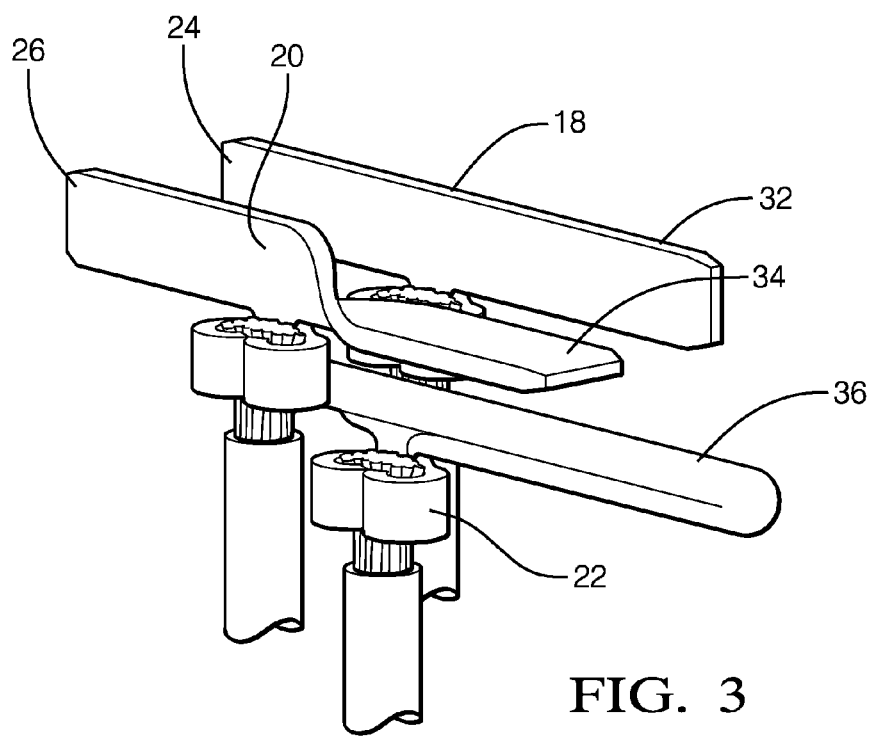
FIG. 3 is a perspective front view of double ended terminals within the plug housing of FIG. 2 according to one embodiment.

The plug housing 16 contains a set of double ended terminals 18, 20, 22 attached to the power and ground wires shown in FIG. 3. One end 24, 26, 28 of each of the terminals 18, 20, 22 projects from a first surface 30 of the plug housing 16 and the other end 32, 34, 36 of each of the terminals 18, 20, 22 project from a second surface 38 of the plug housing 16 opposite the first surface 30. Power terminals 18, 20 attached to the power wires have first power pins 24, 26 and second power pins 32, 34, in this case in the form of blades having a generally rectangular cross section. The major surfaces of the sides of one of the first power pins 24 are substantially parallel to the to the major surfaces of the sides of a second power pin 32. The major surfaces of the sides of the other first power pin 26 are substantially perpendicular to the major surfaces of the sides of the other second power pin 34. As used herein, substantially parallel is ±5° of absolutely parallel and substantially perpendicular is ±5° of absolutely perpendicular. The ground terminal 22 has a first ground pin 28 and a second ground pin 36 having a generally round cross section. The width, thickness, length and position of the first power and ground pins 24, 26, 28 meet NEMA 5-15P standards. The width, thickness, length and position of the second power and ground pins 32, 34, 36 meet NEMA 6-20P standards. The power and ground terminals 18, 20, 22 are formed of a conductive material, such as a copper alloy. The power and ground terminals 18, 20, 22 may be secured within the plug housing 16 by molding the plug housing 16 around the terminals 18, 20, 22 using an inert molding process. Alternatively, the terminals 18, 20, 22 may be held in place by mounting features within a cavity (not shown) inside the plug housing 16.

The plug housing 16 further defines a pair of pivot posts 40 projecting from side surfaces 42 of the plug housing 16 adjacent the first and second surfaces 30, 38 of the plug housing 16. The pivot posts 40 have a generally cylindrical shape and project substantially perpendicularly from the side surfaces 42.

The plug housing 16 may also include a thermistor (not shown) to detect a temperature of the plug assembly 14. The electrical device 10 connected to the plug assembly 14 may be designed to take countermeasures to reduce the plug assembly 14 temperature if it exceeds a temperature threshold.

Figure 4:
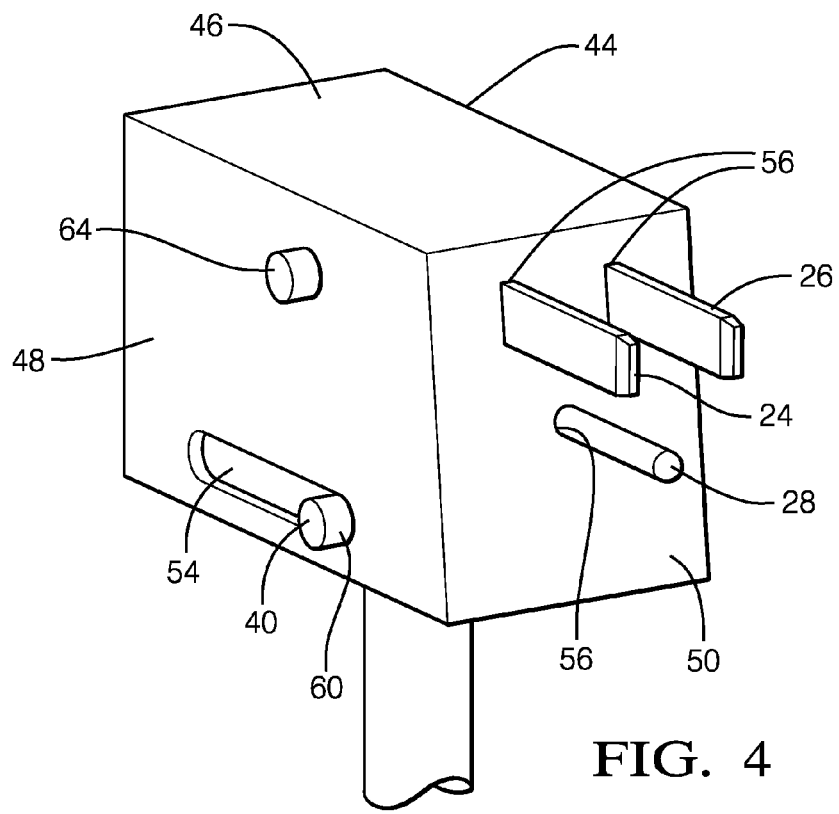
FIG. 4 is a perspective front view of an enclosure covering the plug housing of FIG. 2 in a first location showing a first plurality of terminal pins protruding through a first end wall of the enclosure according to one embodiment.
Figure 5:
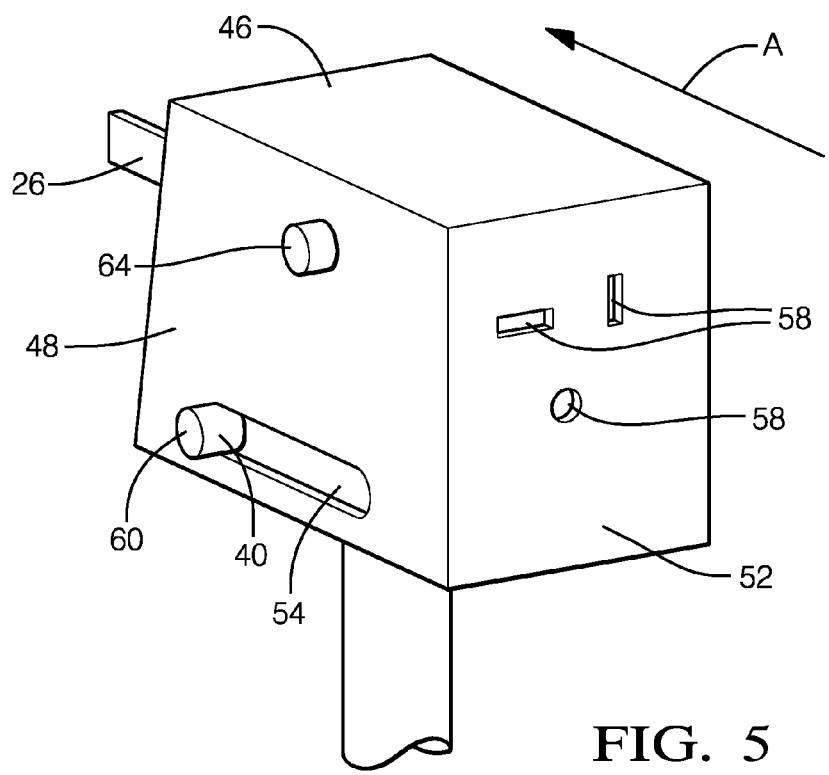
FIG. 5 is a perspective rear view of an enclosure in the first location of FIG. 4 enclosing a second plurality of terminal pins behind a second end wall opposite the first end wall of the enclosure according to one embodiment.
Figure 6:
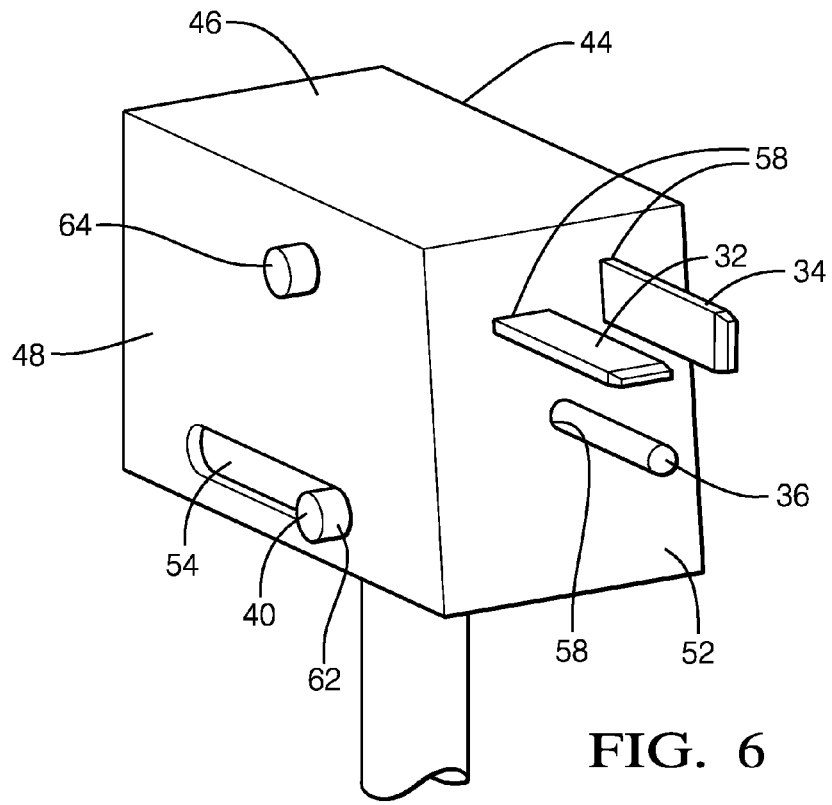
FIG. 6 is a perspective front view of the enclosure in a second location showing the second plurality of terminal pins protruding through the second end wall of the enclosure according to one embodiment.
Figure 7:
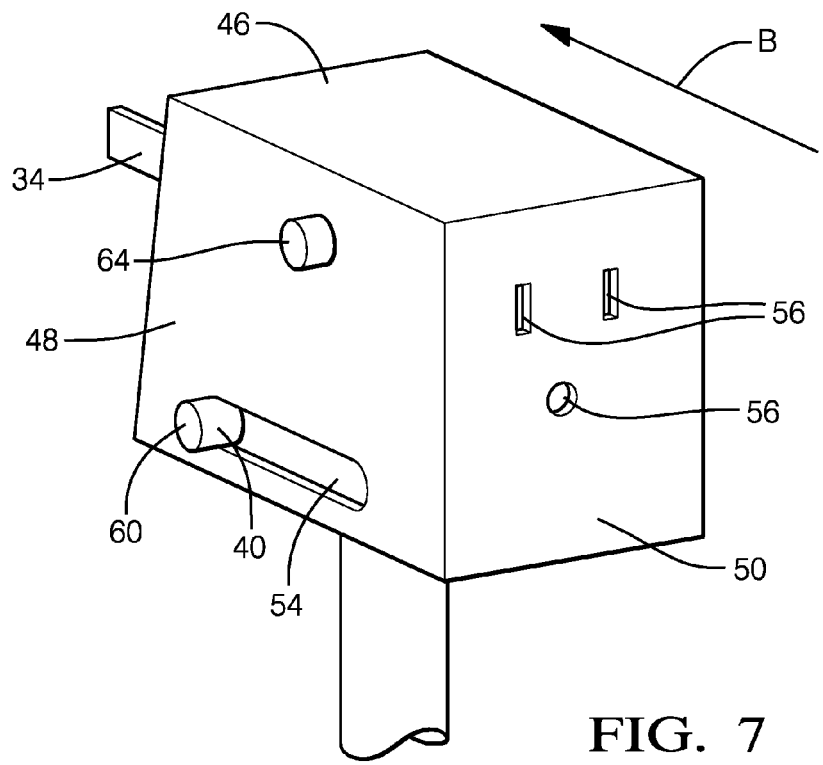
FIG. 7 is a perspective rear view of the enclosure in the second location of FIG. 6 enclosing the first plurality of terminal pins behind the first end wall of the enclosure according to one embodiment.

FIGS. 4 and 5 illustrates a non-limiting example of an enclosure 44 that is slideably attached to the plug housing 16. The enclosure 44 generally defines an open rectangular box shape having a top wall 46, two opposed side walls 48 and two opposed end walls 50, 52 and open bottom. The enclosure 44 defines a cavity (not shown) in which the plug housing 16 is received. The two opposed side walls 48 each define linear slots 54 extending therethrough in which the pivot posts 40 are received, thereby slideably attaching the enclosure 44 to the plug housing 16. The linear slots 54 run substantially perpendicular to the end walls 50, 52. As shown in FIG. 4, a first end wall 50 defines a first set of apertures 56 corresponding to the sizes and locations of the first power pins 24, 26 and the first ground pin 28 through which these pins 24, 26, 28 may protrude. As shown in FIG. 5, a second end wall 52 of the enclosure 44 opposite the first end wall 50 defines a second set of apertures 58 corresponding to the sizes and locations of the second power and ground pins 32, 34, 36 through which these pins 32, 34, 36 may protrude.

The length of the top and side walls 46, 48 is configured so that the first power and ground pins 24, 26, 28 are at least partially enclosed within the enclosure 44 when the second power and ground pins 32, 34, 36 protrude from the second set of apertures 58 and the second power and ground pins 32, 34, 36 are at least partially enclosed within the enclosure 44 when the first power and ground pins 24, 26, 28 protrude from the first set of apertures 56.

As illustrated in FIGS. 4-7, by sliding the pivot post 40 along the linear slot 54, the enclosure 44 is moveable from a first location 60 to a second location 62 by sliding the enclosure 44 in a first direction A. In the first location 60, the first power and ground pins 24, 26, 28 fully protrude from the first set of apertures 56 (see FIG. 4) and the second power and ground pins 32, 34, 36 are fully enclosed within the enclosure 44 (see FIG. 5) inhibiting inadvertent contact with an energized second power pin 32, 34 when the first power pins 24, 26 are mated to a power receptacle. In the second location 62, the second power and ground pins 32, 34, 36 fully protrude from the second set of apertures 58 (See FIG. 6) and the first power and ground pins 24, 26, 28 are fully enclosed within the enclosure 44 (see FIG. 7) inhibiting inadvertent contact with an energized first power pin 24, 26 when the second power pins 32, 34 are mated to a power receptacle. The enclosure 44 is further guided by the engagement of the first power and ground pins 24, 26, 28 with the first set of apertures 56 and/or second power and ground pins 32, 34, 36 with the second set of apertures 58. The enclosure 44 is returned moveable to the first location 60 from the second location 62 in by sliding the enclosure 44 in a second direction B.

Each outer side wall 48 of the enclosure 44 also defines a slide post 64 projecting outwardly from the side wall 48. The slide posts 64 preferably have a generally cylindrical shape and project substantially perpendicularly from the side walls 48, however other slide post shapes, such as square or rectangular may be suitable. The slide posts 64 are received in slider slots 66 in a hood 68 attached to both the plug housing 16 and the enclosure 44.

Figure 8:
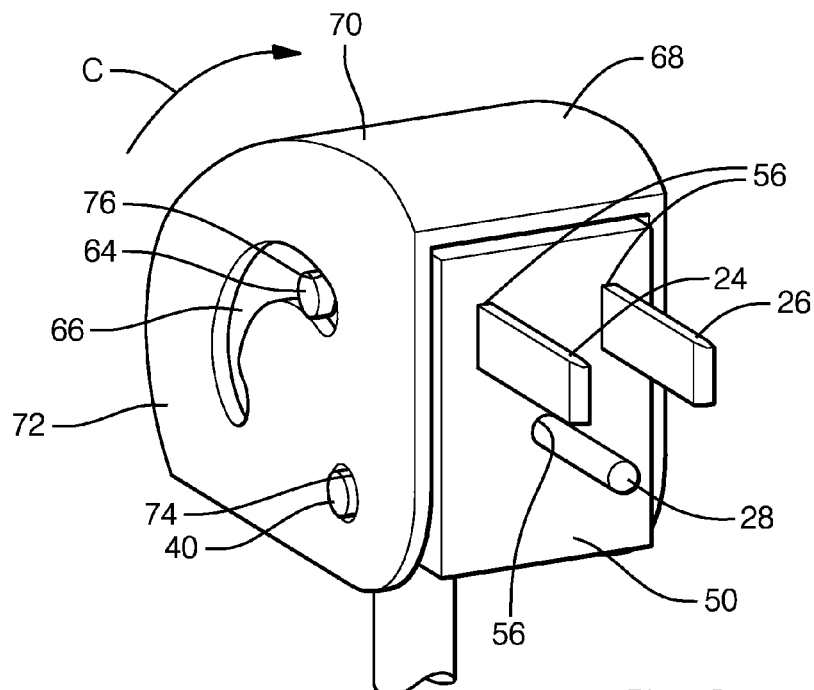
FIG. 8 is a perspective front view of a hood pivotally attached to the plug housing and slideably attached to the enclosure in a first position according to one embodiment.
Figure 9:
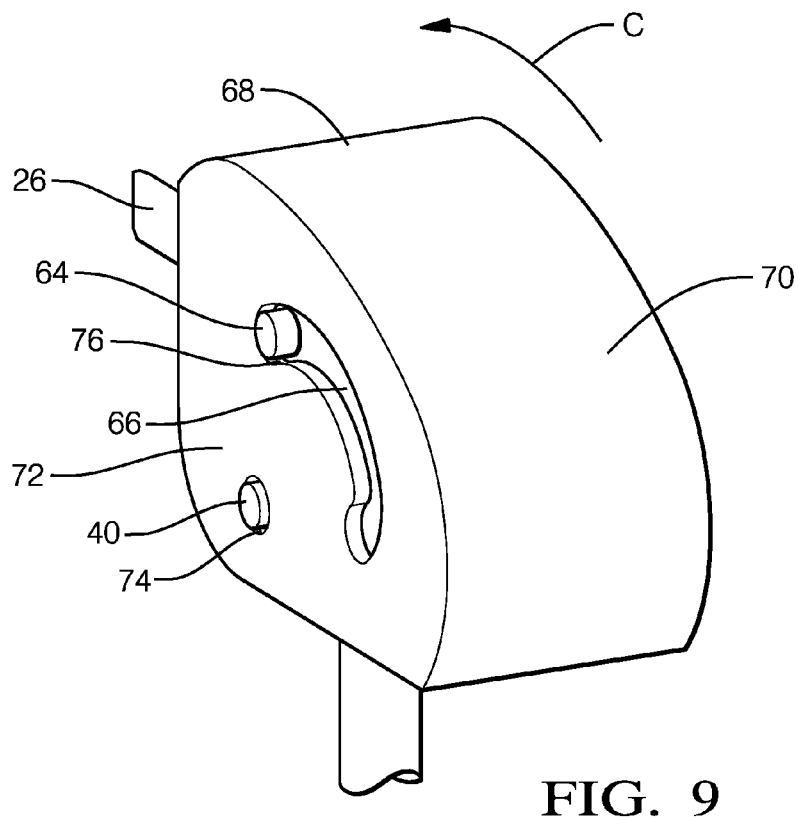
FIG. 9 is a perspective rear view of the hood in the first position according to one embodiment.

FIGS. 8 and 9 illustrate the hood 68 of the plug assembly 14. The hood 68 has an arcuate top wall 70 and two generally sector shaped side walls 72. Each of the side walls 72 of the hood 68 define arcuate slider slots 66 and pivot apertures 74. The pivot posts 40 of the plug housing 16 are received within the pivot apertures 74 thereby pivotally attaching the hood 68 to the plug housing 16. The slide posts 64 of the enclosure 44 are received within the slider slots 66 thereby slideably attaching the hood 68 to the enclosure 44. The slider slots 66 limit rotation of the hood 68 about the pivot posts 40 from a first position 76 to a second position 78. When in the first position 76 shown in FIGS. 8 and 9, the top wall 70 of the hood 68 covers and encloses the second of apertures 58 further inhibiting inadvertent contact with an energized second power pin 32, 34 when the first power pins 24, 26 are mated to a power receptacle (not shown).

Figure 10:
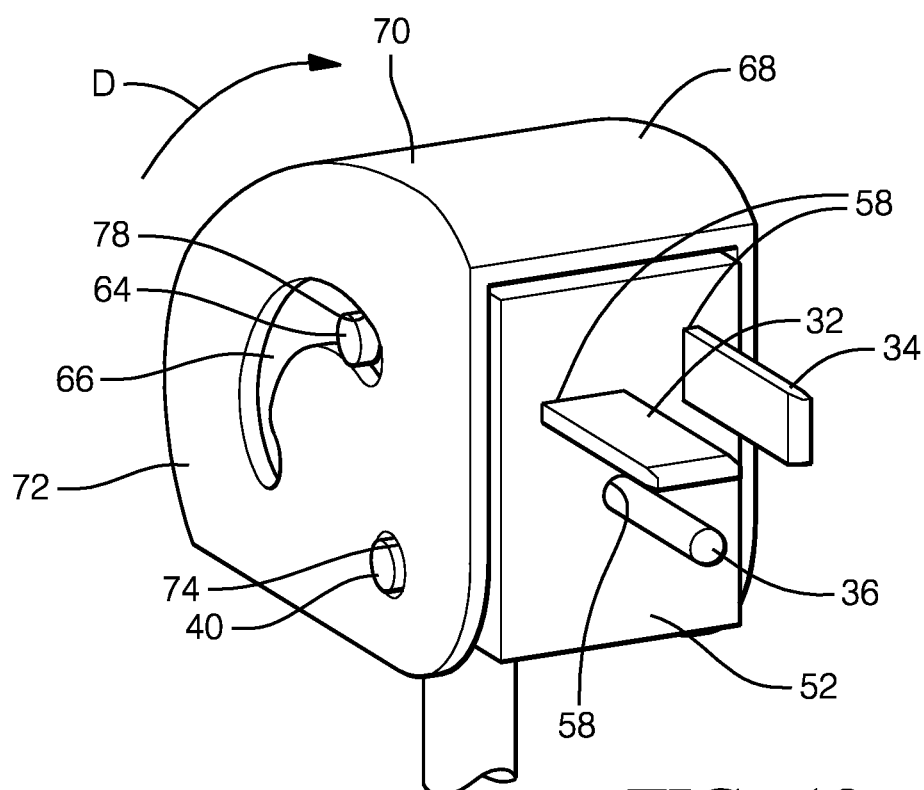
FIG. 10 is a perspective front view of the hood in a second position according to one embodiment.

As the hood 68 is rotated from the first position 76 to the second position 78 shown in FIG. 10 by rotating the hood 68 in the direction C. The slide posts 64 and the slider slots 66 cooperate to push the enclosure 44 from the first location 60 to the second location 62. The top wall 70 of the hood 68 covers and encloses the first set of apertures 56 when in the second position 78 further inhibiting inadvertent contact with an energized first power pin 24, 26 when the second power pins 32, 34 are mated to a power receptacle. The hood 68 is returned to the first position 76 by rotating the hood 68 in the direction D, thus moving the enclosure 44 to back the first location 60. The arcuate slider slots 66 allow the hood 68 to rotate and partially cover one end of each of the terminals 18, 20, 22 e.g. first power and ground pins 24, 26, 28, before the hood 68 starts sliding the enclosure 44, e.g. from the first position 76 to the second position 78. The hood 68 is configured to at least partially enclose one end of each of the terminals 18, 20, 22, e.g. first power and ground pins 24, 26, 28, before moving the enclosure 44 to expose the other end of the terminals, e.g. second power and ground pins 32, 34, 36. This feature prevents the plug assembly 14 from being plugged in to a power receptacle while enclosure 44 is moved between positions and reduces the likelihood of inadvertent contact with an energized power pin, e.g. the second power pins 32, 34.

As illustrated herein, the configuration, i.e. pin length height, thickness and relative location, of the first power and ground pins 24, 26, 28 conform to a first technical specification, particularly a NEMA 6-20P standard used with 220V/60 Hz AC power in North America and the configuration of the second power and ground pins 32, 34, 36 conform to a second technical specification distinct from the first technical specification, particularly a NEMA 5-15P standard used with 110V/60 Hz AC power in North America.

Accordingly, an electric vehicle battery charging device 10 with a power supply cord 12 having an adaptable electrical plug assembly 14 is provided. Thus a single power supply cord 12 terminated by a plug assembly 14 may be used to supply either 110V or 220V AC power to the electric vehicle battery charging device 10. The plug assembly 14 provides the benefit of being compatible with power receptacles conforming to two different technical standards, e.g. a NEMA 5-15R and a NEMA 6-20R receptacle, without the need for a separate adapter. The plug assembly 14 may be more flush to a receptacle in which it is mated than a plug using a separate adapter. The plug adapter further provides the benefit of protecting the unmated pins within an enclosure 44 behind the hood 68.

While the illustrated examples contained herein show a plug assembly 14 that is adaptable between NEMA 5-15P and NEMA 6-20P technical standards used primarily in North America, other embodiments may be envisioned where the power and ground pins conform to other technical standards used in different parts of the world.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An electrical plug assembly, comprising:
   a plug housing including:
   a plurality of conductive first pins projecting from a first surface of the plug housing,
   a plurality of conductive second pins projecting from a second surface of the plug housing opposed to the first surface;
   an enclosure slideably attached to the plug housing and defining a first plurality of apertures though which the plurality of first pins may protrude and a second plurality of apertures though which the plurality of second pins may protrude, wherein the plurality of first pins are at least partially enclosed within the enclosure when the plurality of second pins protrude from the second plurality of apertures and the plurality of second pins are at least partially enclosed within the enclosure when the plurality of first pins protrude from the first plurality of apertures; and
   a hood pivotally attached to the plug housing and slideably attached to the enclosure and rotatable from a first position to a second position, wherein the hood is configured to urge the enclosure from a first location to a second location.

2. The electrical plug assembly according to claim 1, wherein the plurality of first pins are fully enclosed within the enclosure and the plurality of second pins protrude from the second plurality of apertures when the enclosure is in the first location and the plurality of second pins are completely enclosed within the enclosure and the plurality of first pins protrude from the first plurality of apertures when the enclosure is in the second location.

3. The electrical plug assembly according to claim 1, wherein the enclosure is in the first location when the hood is in the first position and the enclosure is in the second location when the hood is in the second position.

4. The electrical plug assembly according to claim 3, wherein the hood encloses the first plurality of apertures when in the first position and the hood encloses the second plurality of apertures when in the second position.

5. The electrical plug assembly according to claim 1, wherein a configuration of the plurality of first pins conform to a first technical specification and a configuration of the plurality of second pins conform to a second technical specification distinct from the first technical specification.

6. The electrical plug assembly according to claim 5, wherein the configuration of the plurality of first pins conform to a National Electrical Manufacturers Association (NEMA) 5-15P standard.

7. The electrical plug assembly according to claim 5, wherein the configuration of the plurality of second pins conform to a NEMA 6-20P standard.

8. An electrical plug assembly reconfigurable to mate with two different electrical receptacles conforming to different technical specifications, comprising:
  a plurality of conductive electrical terminals, each defining a conductive first pin and a conductive second pin;
  a plug housing in which the plurality of electrical terminals are disposed and having a first end surface from which the plurality of first pins project and a second end surface opposed to the first end surface from which the plurality of second pins project and defining pivot posts projecting from the plug housing; and
  an enclosure having two opposed side walls, two opposed end walls and a top wall defining cavity in which the plug housing is received, wherein said two opposed side walls each define slide posts projecting from the side walls and linear slots in which the pivot posts are received, thereby slideably attaching the enclosure to the plug housing, wherein a first end wall of the two opposed end walls defines a first plurality of apertures though which the plurality of first pins may protrude and a second end wall of the two opposed end walls defines a second plurality of apertures though which the plurality of second pins may protrude, and wherein the plurality of first pins are at least partially enclosed within the enclosure when the plurality of second pins protrude from the second plurality of apertures and the plurality of second pins are at least partially enclosed within the enclosure when the plurality of first pins protrude from the first plurality of apertures.

9. The electrical plug assembly according to claim 8, further comprising a hood having an arcuate top wall and two generally sector shaped side walls, each defining arcuate slots and pivot apertures, said pivot posts of the plug housing are received within the pivot apertures thereby pivotally attaching the hood to the plug housing and said slide posts of the enclosure are received within the arcuate slots thereby slideably attaching the hood to the enclosure and limiting rotation of the hood about the pivot posts from a first position to a second position, wherein the slide posts and the arcuate slots cooperate to urge the enclosure from a first location to a second location.

10. The electrical plug assembly according to claim 9, wherein the plurality of first pins are fully enclosed within the enclosure and the plurality of second pins protrude from the second plurality of apertures when the enclosure is in the first location and the plurality of second pins are completely enclosed within the enclosure and the plurality of first pins protrude from the first plurality of apertures when the enclosure is in the second location.

11. The electrical plug assembly according to claim 9, wherein the enclosure is in the first location when the hood is in the first position and the enclosure is in the second location when the hood is in the second position.

12. The electrical plug assembly according to claim 9, wherein the hood encloses the second plurality of apertures when in the first position and the hood encloses the first plurality of apertures when in the second position.

13. The electrical plug assembly according to claim 9, wherein a configuration of the plurality of first pins conform to a first technical specification and a configuration of the plurality of second pins conform to a second technical specification distinct from the first technical specification.

14. The electrical plug assembly according to claim 13, wherein the configuration of the plurality of first pins conform to a National Electrical Manufacturers Association (NEMA) 5-15P standard.

15. The electrical plug assembly according to claim 13, wherein the configuration of the plurality of second pins conform to a NEMA 6-20P standard.

\* \* \* \* \*